United States Patent [19]

Kavchok

[11] 4,300,615

[45] Nov. 17, 1981

[54] FABRIC COMPOSITE AND RUBBER REINFORCED THEREWITH

[75] Inventor: Ronald W. Kavchok, Bellemead, N.J.

[73] Assignee: The Goodyear Tire & Rubber Company, Akron, Ohio

[21] Appl. No.: 130,879

[22] Filed: Mar. 17, 1980

[51] Int. Cl.³ .............................................. B60C 9/00
[52] U.S. Cl. .............................. 152/357 R; 152/359; 156/110 A; 156/331.2; 156/335; 156/331.6; 428/265; 428/267; 428/272; 428/504
[58] Field of Search ........... 156/110 A, 110 MD, 331, 156/335; 152/357 R, 359; 428/265, 267, 272, 504

[56] References Cited

U.S. PATENT DOCUMENTS 3,226,276 12/1965 Rye et al. ........................... 156/335
3,298,985 1/1967 Bills et al. .......................... 260/29.3
3,968,295 7/1976 Solomon .......................... 156/110 A

*Primary Examiner*—John E. Kittle
*Attorney, Agent, or Firm*—H. C. Young, Jr.

[57] ABSTRACT

A textile fabric composite comprised of a cord or fabric and an adhesive coating thereon formed by the application of an aqueous emulsion composition, said composition is comprised of the emulsion polymerization product of a monomer mixture of butadiene and either (a) glycidyl methacrylate and monomeric amide or (b) styrene, 2-vinyl pyridine and monomeric amide. The invention further relates to a composite, such as a pneumatic rubber tire reinforced with such fabric composite. The invention additionally relates to said emulsion composition used for the coating of the said fabric composite.

9 Claims, No Drawings

FABRIC COMPOSITE AND RUBBER REINFORCED THEREWITH

FIELD OF INVENTION

This invention relates to a textile fabric composite comprised of a coated fabric or cord as well as a composite of rubber having a reinforcement of such composite. The invention additionally relates to an aqueous emulsion composition for such coating.

BACKGROUND OF THE INVENTION

Molded rubber products often contain fabric reinforcement. The fabric is typically prepared by coating the cord, or fabric, by passing it through an aqueous latex followed by drying the coated cord. In such a cord dipping procedure, the dried polymer coating obtained on the cord provides an adhesive base for adhering rubber to the fabric. The rubber is generally applied to the cord with the aid of heat and pressure such as by calendering.

The cord to rubber adhesion is complex in nature and dependent largely upon the ability of the coating on the fabric to remain resistant to oxidative degradation, such as while the fabric is being stored prior to use, during application of rubber to the coated fabric and during utilization of the reinforced rubber. Degradation of the coating such times can result in an inferior adhesion to rubber and could well result in a delamination of the rubber from the fabric in the finished article, particularly during use.

Certainly degradation of various elastomers due to environmental conditions is well known. Rubbery coatings when deposited from copolymer latices and used as fabric adhesives have been known to lose their elasticity and to even split or crack when subjected to oxygen at elevated temperatures. It is generally recognized that oxygen and ozone, as well as ultraviolet light, are major causes of such degradation and generally considered detrimental to rubber stocks themselves.

Resorcinol formaldehyde/vinyl pyridine latex blends (often called RFL's) are often used as tire cord adhesives as being applied to tire cords to enhance their adhesion to rubber. However, it is understood that adhesion of the treated cord to the rubber can be degraded or substantially reduced if the RFL coating is excessively exposed to environmental conditions prior to use.

It should be pointed out that it is often a general practice to simply dry cords which have been treated with latex adhesive, such as RFL, in a gas fired hot air oven during which the treated fabric can be subjected to the combustion products of the oil. With such procedures, it has sometimes been observed that the adhesive has been sufficiently degraded that an early failure of a cord/rubber composite occurred involving a delimination of the rubber from the cord. Although this delamination may have primarily been due to the determination has not been fully verifed.

The use of an antioxidant would be expected to improve the resistance of the polymeric coating on the cord to oxidative degradation. However, there is apparently a hesitation to use antioxidants in the fabric aqueous latex dip for various reasons. For example, an antioxidant can conventionally be added to a latex in an emulsion form. However, the presence of additional foreign materials, such as emulsifiers, can become a residue on the coated cord and can adversely affect its adhesion to rubber. In addition, the cord-dip process typically requires the use of relatively dilute or diluted latex of relatively low solids content. Dilution of a latex containing an antioxidant could reasonably be expected to cause a precipitation or setting out of the antioxidant from the latex. Indeed, a low solids content of a diluted latex can particularly be susceptible to precoagulation.

Thus, it is desirable that a method be derived, or provided, for providing a reasonably stable aqueous cord dip and coated cords resulting therefrom having a resistance to atmospheric degradation.

Therefore, an object of this invention is to provide a coated cord or textile fabric thereof resulting from a latex having a degree of protection against oxidative degradation and rubber reinforced therewith. It is a further object to provide an aqueous latex dip, or coating, for textile cord having a degree of stability against pre-coagulation.

DISCLOSURE AND PRACTICE OF THE INVENTION

In accordance with this invention, a textile fabric composite is provided which can suitably be used as a reinforcement of molded rubber articles which is comprised of (A) a cord or fabric thereof composed of fibers selected from at least one of nylon, polyester or aramid and (B) an adhesive coating thereon formed by the steps of (1) applying an aqueous emulsion composition coating to said fabric and (2) drying the coated cord or fabric, wherein said aqueous emulsion composition is comprised of (a) the emulsion polymerization product of monomers comprised of (i) about 60 to about 95, preferably about 65 to about 85, parts by weight butadiene, (ii) about 5 to about 40, preferably about 15 to about 35 parts by weight glycidyl methacrylate and (iii) about 0.5 to about 10, preferably about 0.8 to about 4, parts by weight monomeric amide or (b) the emulsion polymerization product of (i) about 50 to about 90, preferably about 60 to about 80, parts by weight butadiene, (ii) about 0 to about 25, preferably about 10 to about 20, parts by weight styrene, (iii) about 5 to about 25, preferably about 10 to about 20, parts by weight 2-vinyl pyridine and (iv) about 0.5 to 10, preferably 0.8 to about 4, parts by weight monomeric amide; wherein said monomeric amide is selected from at least one of N-(4-anilinophenyl)methacrylamide or N-(4-anilinophenyl)acrylamide.

In further accordance with this invention, said aqueous emulsion composition suitable for providing a coating for such a cord or fabric composed of fibers is provided.

The adhesive coating is preferably the emulsion polymerization product of butadiene, glycidyl methacrylate and the monomeric amide.

The cord or fabric composite can then be used to form a reinforced vulcanized rubber composite by applying unvulcanized rubber to the fabric and curing the rubber, preferably by sulfur vulcanization.

Thus, in further accordance with this invention, a composite is provided comprised of vulcanized, preferably sulfur vulcanized, rubber, reinforced with the cord or fabric composite of this invention.

Such a composite is intended to include a pneumatic rubber tire reinforced, at least in part, with such a fabric composite of this invention.

Conventional adhesive systems, as coatings, for such textile fabrics or cords do not typically employ antioxidants in their formulation because it is expected that the resorcinol formaldehyde resin itself generally provides sufficient antioxidant activity to protect the polymer coating when the treated fabric is dried in a more conventional gas-fired oven.

If the monomeric amide antioxidant is added to the epoxy latex through conventional means, such as by direct addition or as an emulsification mixture, the antioxidant is expected to precipitate out of the latex when the latex is diluted to a concentration suitable for use in the coating the fabric, which is normally about 1 to about 5 weight percent, and even more preferably about 3 weight percent. The precipitation is inhibited in this invention by the incorporation of the antioxidant directly into the polymer backbone during its polymerization, therefore, producing a built-in antioxidant.

In the practice of this invention the latex can conveniently be prepared with a final solids concentration of approximately 40 percent. For use in the treatment of the fabric, the epoxy latex can then be diluted down to about 1 to about 5 weight percent solids.

The pH of the epoxy latex should be maintained in the range of about 6 to about 8, preferably about 6.5 to about 7.5, to prevent hydrolysis from occurring to any substantial degree. The vinyl pyridine latex formulation should be maintained at pH in the range of about 10 to about 12, preferably about 10.5 to about 11.5, to prevent any substantial destabilization upon the addition of resorcinol-formaldehyde resin.

Conventional vinyl pyridine latex dip formulations for treatment of fabric or cord followed by conventionally drying the treated fabric at temperatures exceeding 200° C. in an oil-fired oven generally result in substantial losses in an ultimate rubber-to-fabric adhesion. An aqueous emulsion (latex) prepared according to this invention with its built-in antioxidant has been observed to show virtually no losses under identical processing conditions.

It is important to appreciate that this invention does not entirely reside in a technique by which latex is prepared with its built-in antioxidant or by the method in which it is applied, but rather, in the polymer portion of the latex, or coating, itself.

The latexes of the present invention can be used as a fabric dip for virtually conventional reinforcing cords (see U.S. Pat. No. 3,226,276, column 1, lines 37-41) and can generally be compounded with conventional compounding ingredients typically used with the latex.

The following examples are intended to be illustrative. It is understood that the invention is not limited by the exact conditions or treatment recited therein. Unless otherwise stated, parts and percentages are by weight.

EXAMPLE 1

A copolymer of 1,3-butadiene/glycidyl methacrylate/N-4-(anilinophenyl)methacrylamide is prepared on an aqueous emulsion basis using the formulation shown in the following Table 1:

TABLE 1

| Materials | Parts |
| --- | --- |
| Distilled water | 8170 |
| Linear alkyl sulfonate | 114 |
| Potassium hydroxide | 2.5 |
| Sodium salt of condensed naphthalene sulfonic acid | 56.8 |
| Sodium phosphate monobasic | 0.6 |
| Butadiene | 3400 |
| Glycidyl methacrylate | 1135 |
| N-4(anilinophenyl)methacrylamide | 72.5 |

TABLE 1-continued

| Materials | Parts |
| --- | --- |
| t-dodecyl mercaptan | 13.6 |
| Sodium salt of ethylene diamine tetraacetic acid | 3.8 |
| Sodium formaldehyde sulfoxylate | 9.1 |
| para menthane hydroperoxide | 1.4 |

The ingredients of the recipe of Table 1 were charged to a suitable reactor, stirred and heated to about 125° F. A 98 percent conversion of the monomers was realized in about 10 hours. The latex is then discharged from the reactor at about 35 percent solids and the latex pH being about 7.7.

EXAMPLE 2

A recipe similar to that of Example 1 was prepared and used with the following monomers in place of those indicated in Table 1 as shown in the following Table 2:

TABLE 2

| Materials | Parts |
| --- | --- |
| Butadiene | 3175 |
| Styrene | 680 |
| Glycidyl methacrylate | 680 |
| N-4(anilinophenyl)methacrylamide | 72.5 |

The materials, or ingredients, are treated as in Example 1 and a 98 percent conversion is realized in about 10 hours.

EXAMPLE 3

A recipe similar to that of Example 1 is used except for the monomer changes shown in the following Table 3:

TABLE 3

| Materials | Parts |
| --- | --- |
| Butadiene | 3175 |
| Glycidyl methacrylate | 1360 |
| N-4(anilinophenyl)methacrylamide | 72.5 |

The materials or ingredients are treated as in Example 1 and a 96 percent conversion is realized in about 12 hours.

EXAMPLE 4

To Example 3 the N-(4-anilinophenyl) methacrylamide is deleted from the recipe. The ingredients are treated as in Example 1 and a 99 percent conversion is realized in 12 hours.

EXAMPLE 5

Films are cast from each of the latices prepared in Examples 1 through 4 by evaporating the coating of concentrated latex to dryness on flat glassware to form dried films having a thickness of approximately 0.06 inches. The dry films are aged for about 48 hours at about 250° F. and then inspected. The films were relatively light tan in color, soft and flexible. The film derived from Example 4 was relatively dark and discolored and brittle.

EXAMPLE 6

A conventional amine antioxidant, para-amino diphenylamine, similar to N-4(anilinophenyl)methacrylamide, is emulsified by standard emulsification procedure using sodium oleate as emulsifier in a high speed blender. The resulting emulsion is relatively stable and is 50% by weight para-amino diphenylamine. The antioxidant emulsion in an amount of 3.2 parts, is added to 500 parts of the 35% solids latex prepared in Example 4. The latex undergoes destabilization and much coagulum is formed.

EXAMPLE 7

An emulsion of N-4-(anilinophenyl)methacrylamide is prepared according to the procedure of Example 6. The resulting emulsion in an amount of 3.2 parts is added to 500 parts of the 35 percent solids latex prepared in Example 4. Small amounts of coagulum are formed, but generally the latex is stable. To 100 parts of the filtered latex is then added 1100 parts distilled water to provide a total solids content of approximately 3 percent. The N-4-(anilinophenyl)methacrylamide rapidly settles out or precipitates from the latex.

EXAMPLE 8

A latex of the copolymer 1,3-butadiene/styrene/2-vinylpyridine/N-4-(anilinophenyl)methacrylamide is prepared using the formulation shown in the following Table 4:

TABLE 4

| Material | Parts |
| --- | --- |
| Distilled water | 1500 |
| Potassium stearate | 35 |
| Sodium salt of condensed naphthalene sulfonic acid | 5 |
| Tripotassium phosphate | 4 |
| Sodium sulfate | 4 |
| Tertiary dodecyl mercaptan | 6 |
| Butadiene | 700 |
| Styrene | 150 |
| 2-vinylpyridine | 150 |
| N-4(anilinophenyl)methacrylamide | 15 |
| azo bisisobutyronitrile | 5 |

The materials or ingredients of Table 4 are charged to a suitable reactor, stirred and heated to about 125° F. Practically complete conversion occurs in about 12 hours at which time the latex is discharged from the reactor at approximately 40 percent solids.

EXAMPLE 9

A control vinylpyridine latex is made according to the method of Example 8 with the N-4(anilinophenyl)methacrylamide being deleted. The reaction conditions and results were similar to those experienced in Example 8.

EXAMPLE 10

A copolymer latex is prepared according to Example 8 using N-4(anilinophenyl)acrylamide instead of N-4(anilinophenyl)methacrylamide. The reaction conditions and results are similar to those experienced in Example 8.

EXAMPLE 11

The vinylpyridine latices of Examples 8, 9 and 10 are each compounded into a resorcinol formaldehyde latex according to the recipe shown in the following Table 5:

TABLE 5

| Material | Parts |
| --- | --- |
| Distilled water | 296.8 |
| Resorcinol | 11 |
| Formaldehyde (37%) | 16.2 |
| Sodium hydroxide (10%) | 3.0 |
| Vinylpyridine latex (from Examples 8,9 or 10) | 244 |
| Ammonium hydroxide (28%) | 11.3 |

After compounding the resorcinol formaldehyde latex according to the recipe of Table 5 each was matured about 24 hours prior to use. Designating the RFL's with the Example number of the latex from which it was prepared (for example RFL-8 being made from vinyl pyridine latex prepared according to Example 8) the following adhesions resulted when forming composites of the styrene/butadiene rubber to a nylon fabric (obtained as Enkalon 400, Nylon 6) according to Table 6:

TABLE 6

| Adhesion (lbs) | RFL-8 | RFL-9(control) | RFL-10 |
| --- | --- | --- | --- |
| Initial | 25.2 | 32.6 | 32.1 |
| Aged[1] | 29.2 | 29.4 | 28.5 |
| Percent loss | none | 13.0 | 11.0 |
| Aged[2] | 37.3 | 15.0 | 40.2 |
| Percent loss | none | 54.0 | none |

[1]Oven aged, 250° F., 24 hours, hot circulating air
[2]Bomb aged, 300 F., 5 hours, 40 psi air pressure While certain representative embodiments and details have been shown for the purpose of illustrating the invention, it will be apparent to those skilled in this art that various changes and modifications may be made therein without departing from the spirit or scope of the invention.

I claim:

1. A textile fabric composite comprised of (A) a cord or fabric thereof composed of fibers selected from at least one of nylon, polyester or aramid and (B) an adhesive coating thereon formed by the steps of (1) applying an aqueous emulsion composition coating to said fabric and (2) drying the coated fabric, wherein said aqueous emulsion composition is comprised of (a) the emulsion polymerization product of monomers comprised of (i) about 60 to about 95 parts by weight butadiene, (ii) about 5 to about 40 parts by weight glycidyl methacrylate and (iii) about 0.5 to about 10 parts by weight monomeric amide or (b) the emulsion polymerization product of (i) about 50 to about 90 parts by weight butadiene, (ii) about 0 to about 25 parts by weight styrene, (iii) about 5 to about 25 parts by weight 2-vinyl pyridine and (iv) about 0.5 to 10 parts by weight monomeric amide; wherein said monomeric amide is selected from at least one of N-(4-anilinophenyl)methacrylamide or N-(4-anilinophenyl)acrylamide.

2. A composite comprised of a vulcanized rubber reinforced with the fabric composite of claim 1.

3. A pneumatic rubber tire reinforced, at least in part, with the fabric composite of claim 1.

4. The fabric of claim 1 where said adhesive coating applied as about 1 to about 5 weight percent solids epoxy latex having a pH in the range of about 6 to about 8 and dried thereon and where said aqueous emulsion also contains resorcinol and formaldehyde.

5. The textile fabric composite of claim 4 where said adhesive coating is the emulsion polymerization product of butadiene, glycidyl methacrylate and the monomeric amide as well as the resorcinol and formaldehyde.

6. A composite comprised of a sulfur vulcanized rubber reinforced with the fabric composite of claim 5.

7. A pneumatic rubber tire reinforced, at least in part, with the fabric composite of claim 5.

8. The fabric of claim 1 where said adhesive coating applied as about 1 to about 5 weight percent solids epoxy latex having a pH in the range of about 6 to about 8 and dried thereon.

9. The emulsion composition of claim 1 comprised of (a) the emulsion polymerization product of monomers comprised of (i) about 60 to about 95 parts by weight butadiene, (ii) about 5 to about 40 parts by weight glycidyl methacrylate and (iii) about 0.5 to about 10 parts by weight monomeric amide or (b) the emulsion polymerization product of (i) about 50 to about 90 parts by weight butadiene, (ii) about 0 to about 25 parts by weight styrene, (iii) about 5 to about 25 parts by weight 2-vinyl pyridine and (iv) about 0.5 to 10 parts by weight monomeric amide; wherein said monomeric amide is selected from at least one of N-(4-anilinophenyl)methacrylamide or N-(4-anilinophenyl)acrylamide and where said aqueous emulsion also contains resorinol and formaldehyde.

* * * * *